(12) United States Patent
Mondor et al.

(10) Patent No.: US 7,315,456 B2
(45) Date of Patent: Jan. 1, 2008

(54) CONFIGURABLE IO SUBSYSTEM

(75) Inventors: Robert M. Mondor, Sutton, MA (US); Jeffrey Michael Lewis, Maynard, MA (US); Stuart Allen Berke, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 24 days.

(21) Appl. No.: 11/214,075

(22) Filed: Aug. 29, 2005

(65) Prior Publication Data

US 2007/0081315 A1    Apr. 12, 2007

(51) Int. Cl.
*H01R 12/16* (2006.01)

(52) U.S. Cl. .................. 361/788; 710/300; 710/301; 710/302; 710/303; 710/305

(58) Field of Classification Search ............... 361/735, 361/687, 694, 818, 788; 324/509; 370/310; 710/300–305
See application file for complete search history.

(56) References Cited

U.S. PATENT DOCUMENTS

| | | | | |
|---|---|---|---|---|
| 5,191,581 | A * | 3/1993 | Woodbury et al. | 370/364 |
| 5,819,956 | A * | 10/1998 | Rinderer | 211/26 |
| 6,538,903 | B1 * | 3/2003 | Radu et al. | 361/818 |
| 6,633,835 | B1 * | 10/2003 | Moran et al. | 702/190 |
| 6,640,272 | B1 * | 10/2003 | Hartwell et al. | 710/104 |
| 6,662,242 | B2 | 12/2003 | Holm et al. | |
| 6,681,282 | B1 * | 1/2004 | Golden et al. | 710/302 |
| 6,691,192 | B2 | 2/2004 | Ajanovic et al. | |
| 6,718,481 | B1 | 4/2004 | Fair | |
| 6,820,164 | B2 | 11/2004 | Holm et al. | |
| 6,823,283 | B2 * | 11/2004 | Steger et al. | 702/127 |
| 2002/0097563 | A1 * | 7/2002 | Costner | 361/735 |
| 2002/0140433 | A1 * | 10/2002 | Lawson et al. | 324/509 |
| 2002/0152334 | A1 | 10/2002 | Holm et al. | |
| 2003/0131179 | A1 | 7/2003 | Ajanovic et al. | |
| 2003/0158992 | A1 | 8/2003 | Ajanovic et al. | |
| 2004/0044820 | A1 | 3/2004 | Ajanovic et al. | |
| 2004/0062002 | A1 * | 4/2004 | Barringer et al. | 361/687 |
| 2004/0090928 | A1 * | 5/2004 | Drottar et al. | 370/310 |

* cited by examiner

*Primary Examiner*—Dean A. Reichard
*Assistant Examiner*—Xiaoliang Chen (57) ABSTRACT

An enclosure for an input-output (IO) subsystem comprises: a backplane; a plurality of first slots for accepting corresponding IO option modules; a second slot for accepting an IO controller module; a plurality of first connectors corresponding to the plurality of first slots for connecting the corresponding IO option modules to the backplane; a second connector corresponding to the second slot for connecting the IO controller module to the backplane; and wherein the backplane includes communication links for interconnecting the second connector to each of the plurality of first connectors.

25 Claims, 12 Drawing Sheets

CONFIGURABLE IO SUBSYSTEM

BACKGROUND OF THE INVENTION

Multi-processor systems, such as servers and telecommunication (Telco) systems, for example, use input output (IO) subsystems to connect and communicate the host multi-processor system with external communicating units. Around 1992, the industry established an industry standards group, referred to as the Peripheral Component Interconnect—Special Interest Group (PCI-SIG), which was chartered with the development and management of a PCI bus specification as an industry standard for a high-performance IO interconnect to transfer data between one or more central processing units (CPUs) of the host system and the associated peripherals. Recently, the PCI-SIG introduced a successor to PCI called PCI Express (PCI-E) which is emerging as the industry standard IO subsystems interconnect technology for processor systems from small handheld computers, to desktops, small servers, and large SMP servers and mainframes.

The PCI-E standard includes the form factors, connectivity, signal level, and the like for enclosures and IO option cards. Examples of typical IO option cards include network interface cards, such as Ethernet, hard disk storage controller cards such as SCSI and SAS, cluster interconnect cards such as Infiniband™, and the like. One of the new PCI-E form factor technology standards is the PCI-E Server IO Modules (SIOMs). Generally, large SMP IO subsystems implementing the PCI-E SIOM standard are built using an IO motherboard configuration which comprises an enclosure or box having a motherboard and a plurality of module slots for accepting a plurality of SIOMs. Each SIOM includes a standardized connector for connecting electrically to a small "Riser board" and then to the motherboard. The motherboard includes etched conductive runs and one or more IO controller integrated circuits (ICs) containing a plurality of PCI-E Root Ports for interconnecting the SIOMs with the host multi-processor system. The IO enclosures are generally mounted in racks of a cabinet which also houses the multi-processor system and interconnecting IO interface wiring cables.

The PCI-E standard provides for Root Port IO controllers, generally in the form of integrated circuits or chips, to control the communication among the multi-processor system, the SIOMs and the external communicating units. Currently, these IO controller chips are fixedly disposed or integrated on the motherboard, rendering the motherboard active. Thus, while a standard enclosure allows for replaceable SIOMs, it does not permit easy replacement of the IO controller chips of the backplane motherboard for different applications. In addition, the IO operational or slot speeds and link widths are dedicated.

Multi-processor computer systems that may range from four central processing unit (CPU) enclosure types to sixty-four CPU mainframes generally use unique physical implementations of IO enclosures along with different active motherboards to meet the needs of the various applications. This becomes problematic because of the cost of manufacturing, upgrading, and maintaining the many different physical entities and models residing in the field at customer sites. In addition, to support future technology and slot speed upgrades, the entire IO subassembly including the active motherboard needs to be replaced. Moreover, the current IO enclosure implementations do not permit the option to use different cable technologies for the external interface interconnections to support future interconnect upgrades and performance options.

SUMMARY

In accordance with one aspect of the present invention, an enclosure for an input-output (IO) subsystem comprises: a backplane; a plurality of first slots for accepting corresponding IO option modules; a second slot for accepting an IO controller module; a plurality of first connectors corresponding to the plurality of first slots for connecting the corresponding IO option modules to the backplane; a second connector corresponding to the second slot for connecting the IO controller module to the backplane; and wherein the backplane includes communication links for interconnecting the second connector to each of the plurality of first connectors.

DETAILED DESCRIPTION OF THE INVENTION

In order to describe one or more embodiments of the invention, the emerging industry standard PCI Express (PCI-E) technology and PCI Express Server/Workstation Module (a.k.a. Server IO option module (SIOM)) form factors will be used by way of example. However, it is understood that other industry standard IO module form factors, like InfiniBand™ and PICMIG™ Advanced TCA, for example, may also benefit from the invention.

Figure 1:
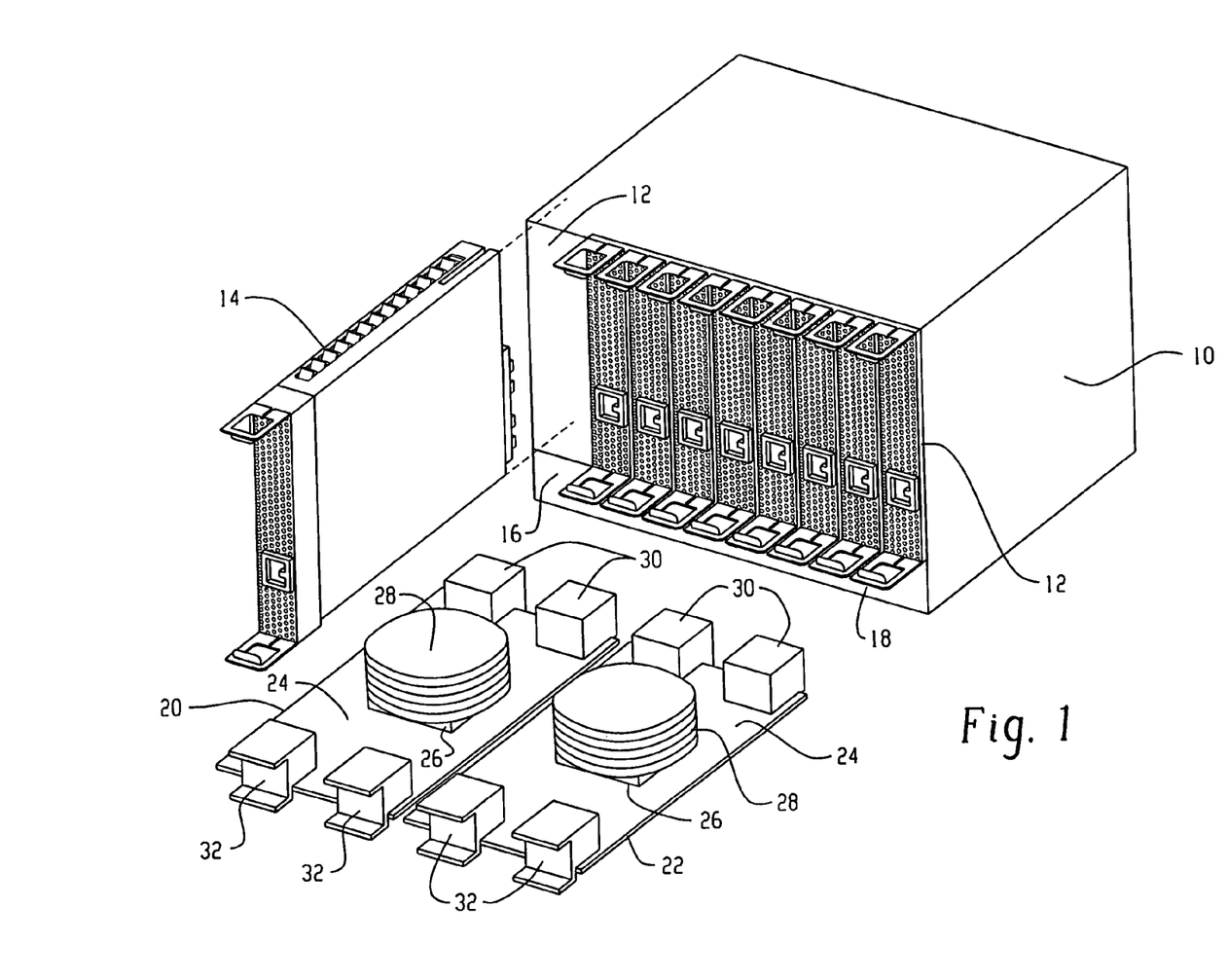
FIG. 1 is an isometric view illustration of an exemplary configurable IO subsystem.

As shown in the illustration of FIG. 1, an exemplary embodiment of a configurable IO subassembly comprises an enclosure 10 having vertical slots 12 for accepting a corresponding plurality of the industry standard PCI-E SIOM form factor modules 14. The width and number of module slots 12 may be optimized to be compliant with IEC, EIA, and IEEE compliant IO rack systems. When fully inserted or plugged into a respective slot, the SIOM 14 will electrically connect to a printed circuit (PC) card of a backplane of the enclosure 10.

The IO subassembly enclosure 10 provides such features as IO controller flexibility, EMI shielding, cooling and power distribution, for example, as will be more fully understood from the more detailed description supra. The depth and cooling of the subassembly may be made to conform to many datacenter and Telco communication rack standards. The subassembly enclosure 10 of the present embodiment is designed to be a modular building block to provide IO configuration versatility to satisfy the various multi-processor system performance product specifications. In addition, the subassembly enclosure 10 may be configured to physically fit into various computer server and Telco markets as well as be applied to future IO technologies other than PCI Express. An advantage of this modular building block approach is the "one size fits all" utilization.

The enclosure 10 further includes horizontal slots 16 and 18 in a space below the vertical slots 12 for accepting one or more IO controller modules, like those shown at 20 and 22, respectively. In the present embodiment, each IO controller module 20 and 22 comprises a printed circuit (PC) board 24 having disposed thereon a plurality of ICs including an IO hub (IOH) controller IC 26 which may require a heat sink 28 for dissipating heat away from the IC 26 during operation thereof. The IO controller PC board 24 may include: one or more rear connectors 30 for electrically connecting to the PC board of the backplane when fully inserted into the corresponding horizontal slot of the enclosure 10, and one or more front connectors 32 for connecting via wire cables to a host system. Each IO controller module 20 and 22 may be interconnected to all of the vertical IO option module slots 12 through PC runs of the backplane.

By disposing the IO controller ICs 26 on one or more external modules 20 and 22, the backplane becomes passive comprising only interconnecting etched conductive runs. Accordingly, in the present embodiment, an IO controller module 20 or 22 may be replaced by unplugging the old module from the backplane of the enclosure 10 and replacing it with a new or upgraded module just as with the IO option modules 14. Thus, the enclosure 10 is no longer limited to the IO controller ICs of a backplane motherboard, but rather now reconfigurable with replaceable IO option and controller modules to suit a particular or changing application.

Figures 2A, 2B:
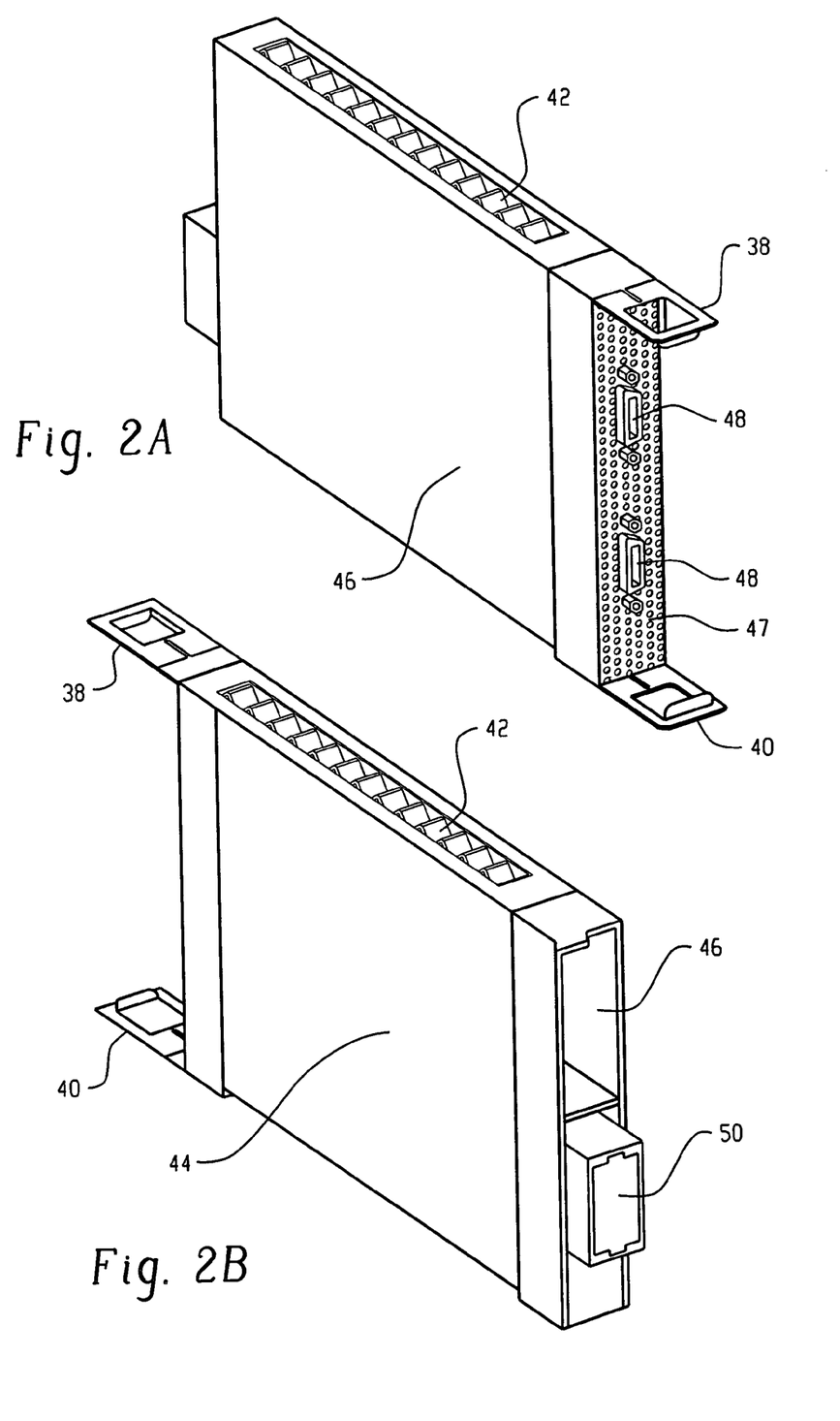
FIGS. 2A and 2B are respective front and back isometric view illustrations of an exemplary IO option module suitable for use in the embodiment of FIG. 1.

An exemplary PCI-E SIOM 14 is shown in front and back isometric view perspectives in FIGS. 2A and 2B, respectively. Referring to FIGS. 2A and 2B, each SIOM 14 includes a top handle 38 and bottom handle 40 that extend out from the front of the SIOM for holding on to the module when inserting it into and unplugging it from the corresponding slot 12 of the enclosure 10. Electrical components of the SIOM may be disposed inside the module, preferably on a PC board. Vented side panels 42 are disposed at the top edge and bottom edge of the PC board of each SIOM to assist cooling air to flow through and over the electrical components of the PC board, normally in the front-to-rear and rear-to-front directions. Left and right side panels 44 and 46, respectively, may be attached to the top and bottom side panels 42 to fully enclose the SIOM on all sides. A front panel 47 perforated with openings is attached to the side panels to enclose the front of the module. The side and front panels 42, 44, 46 and 47 of the SIOM may be made from or coated with a material that provides the internal electrical components protection or shielding from electromagnetic interference (EMI).

Each SIOM 14 may also include one or more connectors 48 attached to the front panel 47 of the module to connect it via a suitable wire cable to an interfacing external unit, which may be a network, a storage interface, a peripheral and the like. Note that the number of connectors 48 and the interconnecting wire cable or cables are option module specific, i.e. dependent on the function performed by the option module. At the rear of the SIOM may be a standardized connector 50 which, when the SIOM is plugged into the corresponding slot 12, connects the option module to the IO controller module or modules via the etched PC runs of the passive backplane. Accordingly, any SIOM may be plugged into any slot of the enclosure, independent of the function it performs. The IO controller module may determine the function of each SIOM plugged into the enclosure in accordance with "plug and play" type methodology, for example.

Each SIOM module may be left open in the rear as shown in FIG. 2B to permit cooling air flow front-to-rear and rear-to-front through the perforated openings of the front panel and vented side panels. This feature will be utilized by the IO subsystem as will become more evident from the description found herein below.

Figure 3:
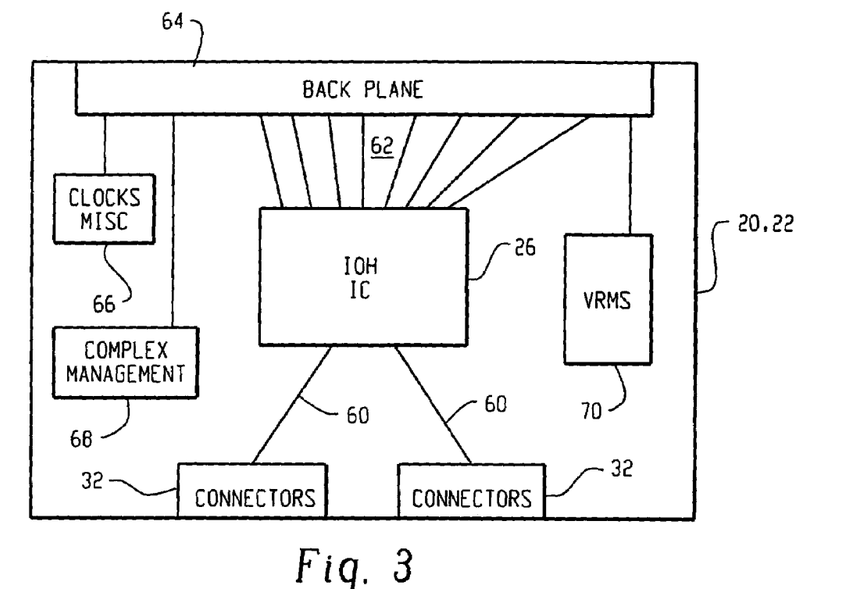
FIG. 3 is a functional block diagram schematic of an exemplary IO controller module suitable for use in the embodiment of FIG. 1.

A functional block diagram schematic of an exemplary IO controller module 20, 22 is shown in FIG. 3. The electronic components of the module may be disposed on a PC board in the form of integrated circuits which may be interconnected through etched PC runs of the board. Referring to FIG. 3, the IO hub IC 26 may be connected to: the connectors 32 through etched PC runs 60, and to each of the SIOM slots 12 of the enclosure 10 via PC runs 62 and the backplane PC board 64 via connectors 30. The IOH IC 26 is operative to perform a translator interface function to bridge communication between the host system via connectors 32 and SIOMs 12 via connectors 30 and backplane PC board 64.

A number of other circuit blocks, which may be disposed on the IO controller module, include clock and miscellaneous logic circuitry 66, complex or "out of band" management circuitry 68, and voltage regulation and monitoring circuit 70. Each of these circuit blocks may be connected to both the IO option and controller modules for utilization thereby. For example, the clock circuit 66 may provide one or more clock signals and associated logic to synchronize the operations of the various modules; the management circuits 68 may provide "out of band" management functions, such as control of powering up states, monitoring of the system for support, service and error logging and the like; and the voltage regulation circuits 70 may convert the input prime voltage levels from power sources to operational voltage levels of the various modules and perform the voltage regulation and monitoring thereof.

Figure 4:
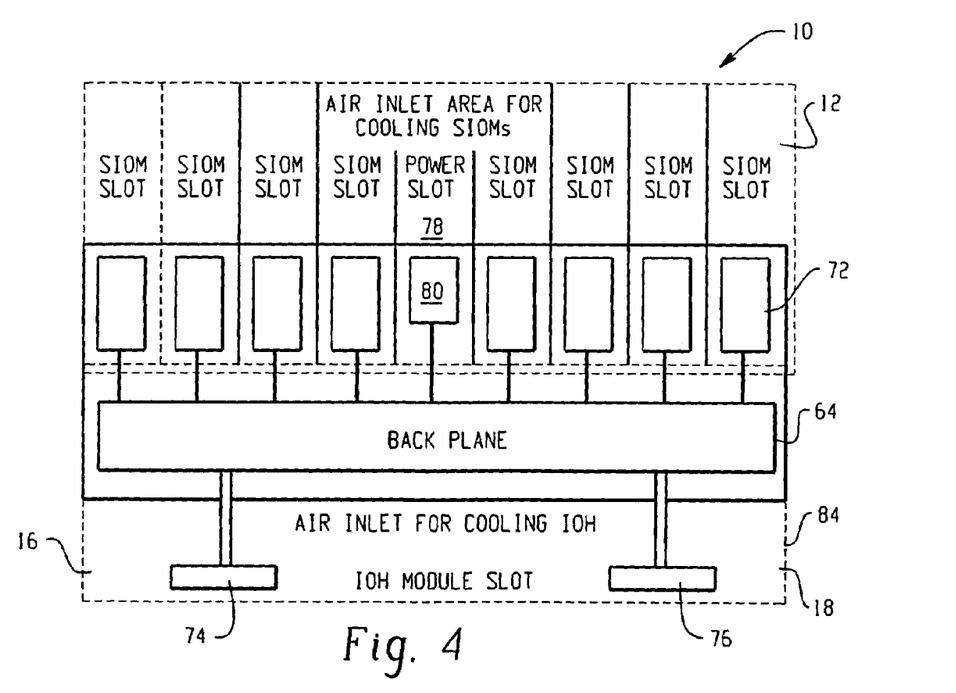
FIG. 4 is a functional illustration of the exemplary configurable IO subsystem.

A functional illustration of the IO subsystem enclosure 10 is shown by way of example in FIG. 4. Referring to FIG. 4, each of the SIOM vertical slots 12 has a corresponding connector 72 for accepting the connector 50 of a SIOM. The connector 72 may be part of the passive backplane assembly and may either be disposed on the PC board backplane 64 or connected thereto. The horizontal IO controller module slots 16 and 18 of the enclosure 10 each include one or more corresponding connectors 74 and 76, respectively, for accepting the connector or connectors 30 of the corresponding IO controller module 20 and 22. The connectors 74 and 76 may be part of the passive backplane assembly and may either be disposed on the PC board backplane 64 or connected thereto.

In addition to the SIOM slots 12, the enclosure 10 may also include one or more slots 78 for a power supply module which may have the same form factor as the SIOM modules 14, for example. Each power slot 78 may have an associated standardized connector 80 for receiving the connector of the corresponding power supply module. The connector 80 may be also part of the passive backplane assembly and may either be disposed on the PC board backplane 64 or connected thereto. Each power supply module be a power source to the other modules of the enclosure wherein low power signals may be distributed from the power supply module to the other modules through etched runs in the passive backplane of the enclosure 10 via associated connector assemblies.

Figure 5:
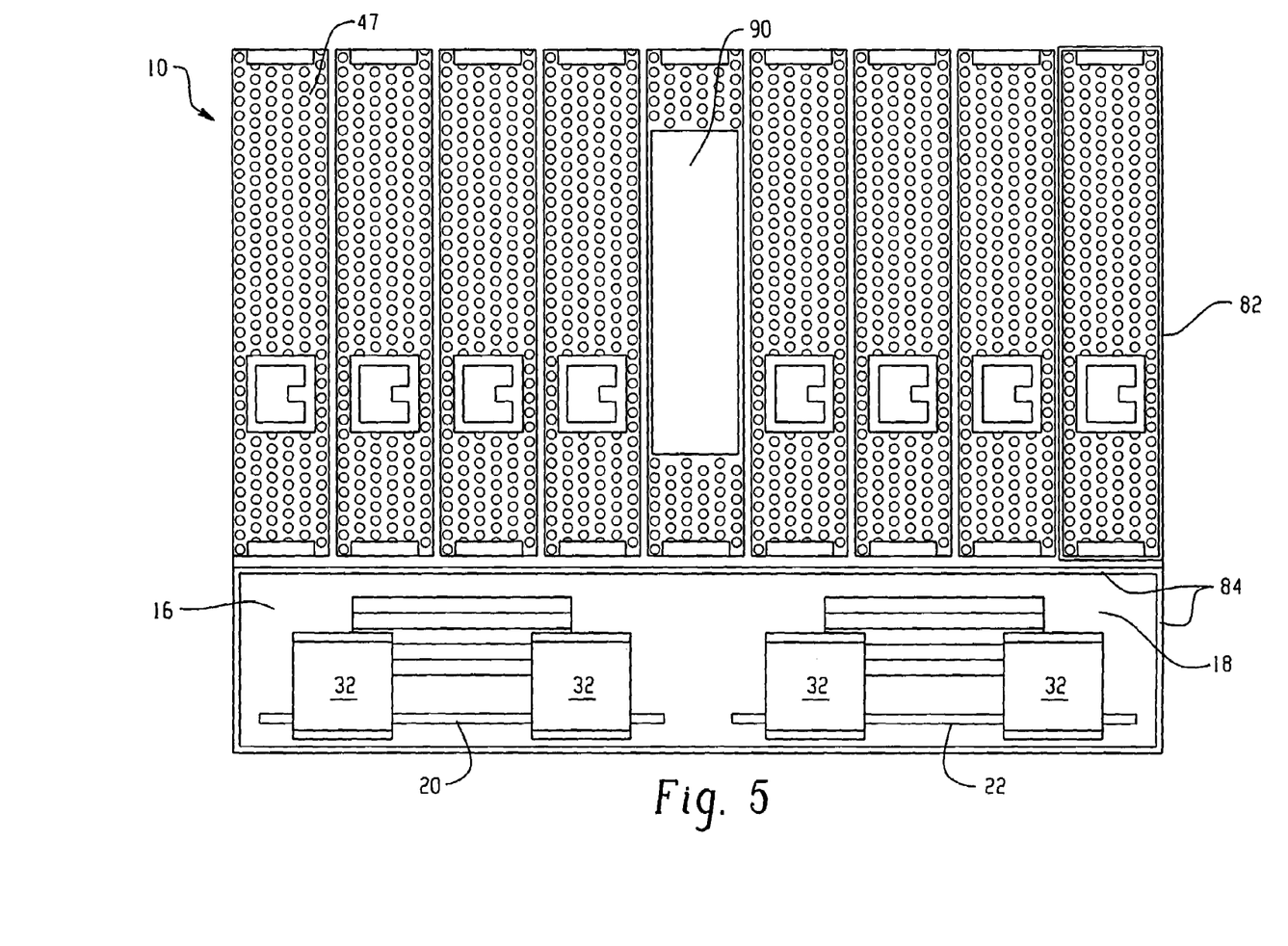
FIG. 5 is a front view illustration of the exemplary configurable IO subsystem depicting IO option and power supply modules.

FIG. 5 is a front view illustration depicting the IO option and power supply modules and IO controller modules plugged into their respective slots of the enclosure 10. The perforated front panels 47 of the IO option and power supply modules provide an air inlet or exit area for cooling such modules. As noted above, each IO option and power supply module is fully enclosed with an EMI shield to protect each such module against EMI signals. A sub-enclosure portion 84 of the enclosure 10 surrounds and forms the slots 16 and 18 for the IO controller modules. This sub-enclosure portion 84 may be also made from or coated with a material that provides the electrical components of the IO controller modules protection or shielding from electromagnetic interference (EMI). After the IO controller modules are plugged into their respective slots of the sub-enclosure 84, enough space is left between the components of the IO modules and walls of the sub-enclosure 84 (see FIG. 5) for air to flow into or exit the sub-enclosure for cooling the components of the IO controller modules located therein. In an alternate embodiment, the IO controller modules 20 and 22 may be inserted in their respective slots in an inverted position to that shown in FIG. 5 to take advantage of the air flow conditions.

Figure 6:
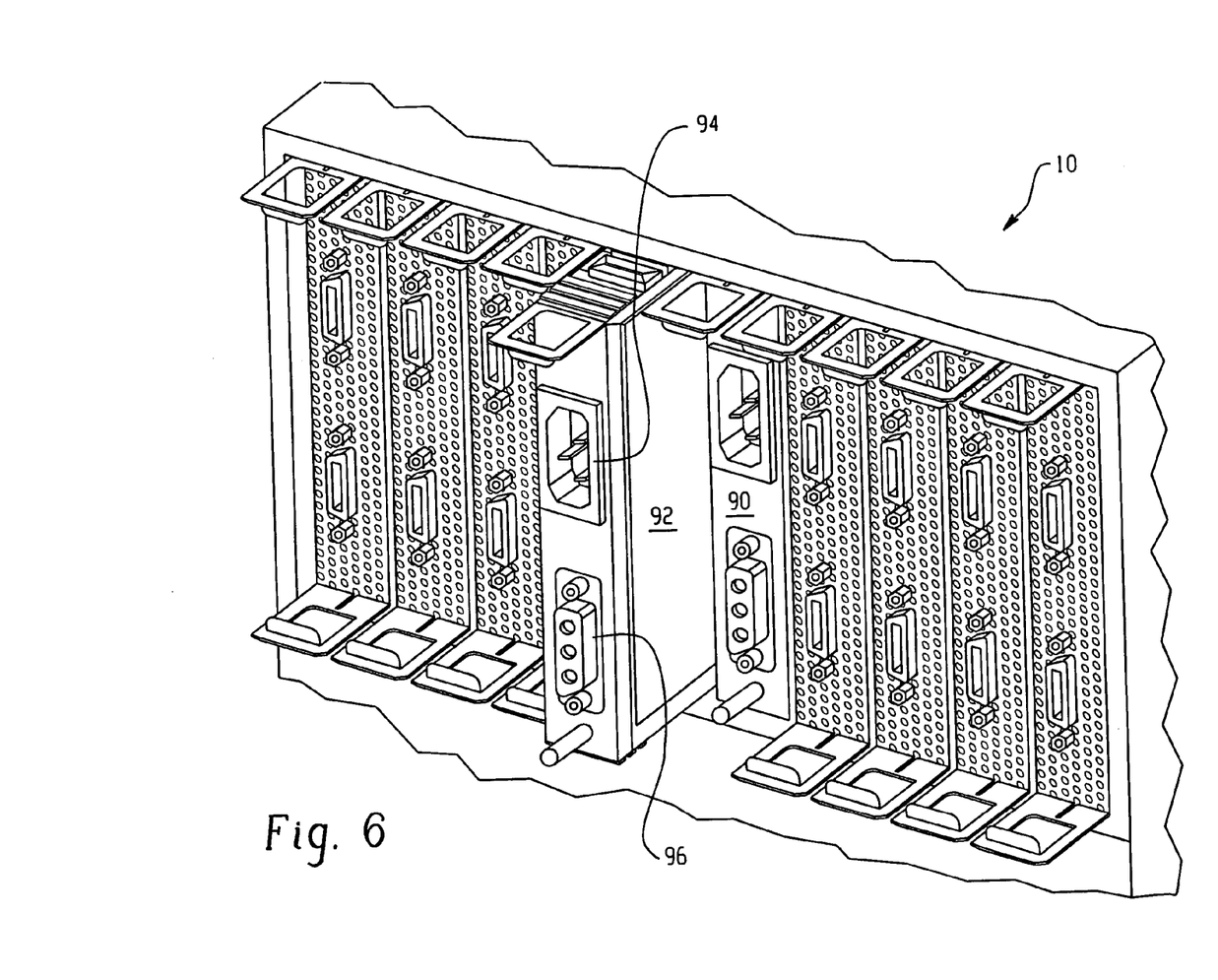
FIG. 6 is a front view isometric illustration of the exemplary configurable IO subsystem depicting IO option and redundant power supply modules.

Note that one power supply module 90 is plugged into the enclosure 10 for the embodiment depicted in FIG. 5. In some cases, as depicted in FIG. 6, a second or redundant power supply module 92 may be plugged into another slot of the enclosure 10 for use as an auxiliary or back-up power source for the enclosure 10. In addition, each power supply module 90 and 92 may include a connector 94 for connecting to an AC power source and a connector 96 for connecting to a DC power source. One or both power sources may be used to supply power to the IO subassembly enclosure 10 via one or both of the power supply modules 90 and 92.

In the PCI-E technology standard, a communication connection between the host system and an IO option card via the IO controller module is referred to as a "link" which may include a "lane" of one upstream differential pair of conductors (IO option module-to-host), and one downstream differential pair of conductors (host-to-IO option module). Each communication link may include more than one communication lane depending on the tasks of the corresponding application specific IO option module. Accordingly, a link designated as X1 is understood to be one lane wide which would include a differential pair of upstream conductors and a differential pair of downstream conductors, a link designated as X2 is understood to be two lanes wide which would include a pair of upstream conductors and a pair of downstream conductors for each lane, and so on. It is known that the PCI-E base technology and SIOM form factor will support configurable bandwidths of X1, X2, X4, X8, and X16 by allowing multiple independent Serializer-Deserializer (SERDES) Lanes to form different multi-lane links as shown in Table 1 below. However, lane width support is currently market and mechanical form dependent.

|  | X1 | X2 | X4 | X8 | X16 |
| --- | --- | --- | --- | --- | --- |
| Per direction BW at "Generation 1" 2.5 GT/s | 250 MB/s | 500 MB/s | 1 GB/s | 2 GB/s | 4 GB/s |
| Per direction BW at "Generation 2" 5 GT/s | 500 MB/s | 1 GB/s | 2 GB/s | 4 GB/s | 8 GB/s |
| Per direction BW at "Generation 3" 10 GT/s (Future) | 1 GB/s | 2 GB/s | 4 GB/s | 8 GB/s | 16 GB/s |

One market segment that has a wide range of bandwidth requirements is the server market. Many of today's volume IO option modules or adapters, like Gigabit Ethernet, Fiber-Channel, and Ultra SCSI, for example, can reach line rate operation with a single PCI-E lane (X1) link. However, emerging ten (10) gigabit technologies, like 10 gE (Ethernet), 10 gFC (Fiber-Channel), or InfiniBand HCA, for example, require a link of X4 lane width. Other multi-channel IO option modules, such as quad or octal S-ATA/SAS, for example, require a link of X4 or X8. Very high bandwidth IO option modules, such as X12 InfiniBand HCAs, multi-channel 10 g devices, and work station graphics, for example, require a link of X16 lanes.

Over the course of the next ten years, IO link bandwidths are expected to increase by a factor of ten or more, with forty (40) gigabit technologies expected by the years of 2007-8 and one-hundred (100) gigabit technologies by the years of 2010-12. Communication links to support these technologies may require X8 or X16 lane widths plus the additional bandwidth provided by Gen 2 and Gen 3 signaling.

As noted in the Background section of the instant application, current IO subassemblies place the IO controller ICs as part of the IO motherboard configuration. Thus, while the IO option modules are replaceable for reconfiguration, the IO motherboard is integrated and not easily replaceable. Thus, IO slot speeds and lane widths of the communication links of the current IO subsystems are dedicated and can not meet the growing needs of the emerging technologies. In order to provide an IO subsystem that is configurable and adaptable to the foregoing described highly fragmented server market bandwidth desires, bandwidth to the various IO option module slots of the subsystem should be effectively distributed.

Another aspect of the present invention provides a way to adapt the dedication of the IO slot speeds, lane widths and capabilities of the communication links for a specific application or upgrade via the use of the removable IO controller card as described infra. The removable IO controller module of the present embodiment may also provide redundancy options, if desired. Accordingly, with the present embodiment, system users need pay only for the performance and features they desire in their markets.

This aspect of the present invention provides for optimizing and configuring PCI-E root port complex ("host bridge") lane width (bandwidth) availability and distribution to a number of IO slots of the subsystem enclosure for target application spaces. It also provides a mechanism to adjust or adapt bandwidth or lane width over time due to increased IO adapter bandwidth desirability within a specific signaling "generation", or to take advantage of lower cost by distributing narrower links at future signaling generations, i.e. "Gen 2", "Gen 3", . . . within the IO subsystem of the present invention without changing the enclosure infrastructure.

The PCI-E SIOM form factor will support lane widths of X1 to X16 per IO option as well as a broad range of interoperable IO option module to IO host bridge lane widths as exemplified by the table below:

| | Slot → | | | |
|---|---|---|---|---|
| Module ↓ | X8 connector with x1 wired | X8 connector with x2 wired | X8 connector with x4 wired | X8 connector with x8 wired |
| x1 | Yes | Yes | Yes | Yes |
| x2 | At x1 only | Yes | Optional | Optional |
| x4 | At x1 only | At x1 only | Yes | Yes |
| x8 | At x1 only | At x1 only | x4 & x1 | Yes |

Note:
in the present embodiment, x16 slots are composed of two adjacent single-wide x8 slots that have the ability to be combined into a single x16 slot. This may be an optional configuration for both modules and chassis.

Figure 7:
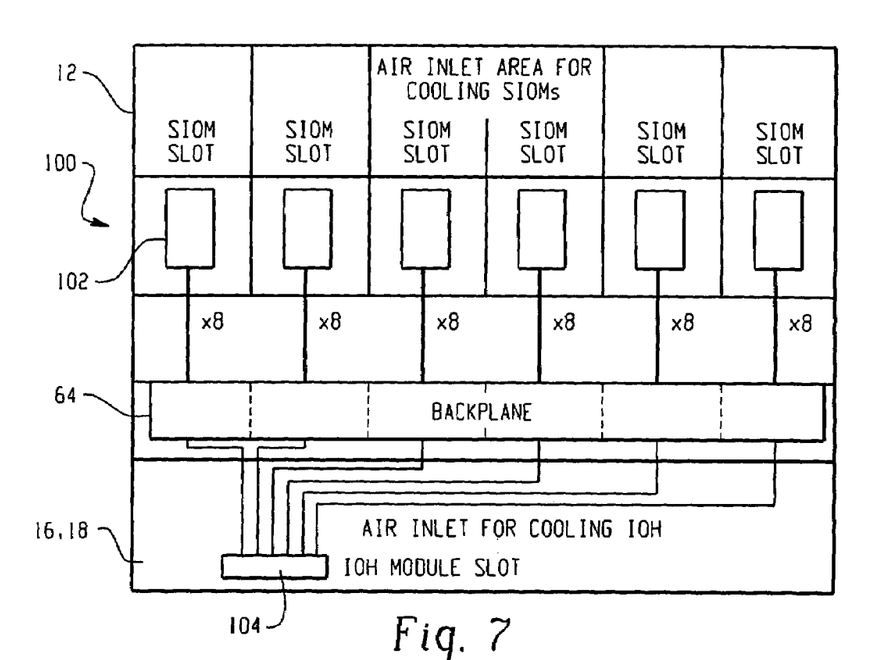
FIG. 7 is a functional illustration of the exemplary configurable IO subsystem depicting IO connectivity between the IO controller module and IO option modules.

Some number of SIOM slots may be provisioned in the subsystem enclosure to provide IO connectivity in such applications as server, telecom, client, and storage, for example. Other applications may benefit from this aspect of the present invention as well. For the purposes of describing this aspect by way of example, six (6) SIOM slots may be configured in an enclosure 100 as shown in the illustration of FIG. 7. The enclosure 100 may be the same or similar to the enclosure 10 described in connection with the embodiment of FIG. 4. Thus, the same reference numerals as used in FIG. 4 for enclosure 10 will be used for like assemblies of the enclosure 100 and the description of such assemblies will remain the same as described herein above for the enclosure 10. Any departures from such descriptions will be addressed below.

Referring to FIG. 7, each SIOM slot 12 of the enclosure 100 is provisioned with a connector 102 that supports the full bandwidth of the SIOM form factor which may be x8, for the present example. In addition, each IO controller module connector slot 16 and 18 provides a connector 104 sufficient to support the full bandwidth to each of the SIOM slot connectors 102 via the passive backplane 64. Every module slot may also contain one high speed link comprising one or more lanes, and about a dozen or so other "sideband" connections for clocks, reset, power good indications, hot plug coordination, power management, and other functions. The standard also provides for a few spare pins for future functions. In the present embodiment, all PCI-E lanes, all sideband signals and all spare signals for each SIOM are routed between the SIOM slot connectors 102 and each IO controller module slot connector 104 via etched PC runs of the passive backplane.

In this manner, the IO subsystem enclosure 100 is pre-wired for the maximum bandwidth capability, at the cost of full bandwidth connectivity and PC board routing/layers of the passive backplane 64. Thus, the IO subsystem enclosure 100 may be used for volume server applications, where a mix of moderate bandwidths for the SIOMs is desired. Any extra cost of the IO subsystem associated with this provisioning will be small in comparison to the savings which results from having a IO subsystem enclosure that can be used for multiple cost/performance applications and may be upgraded to meet bandwidth demands for at least ten years in the future.

Figure 7A:
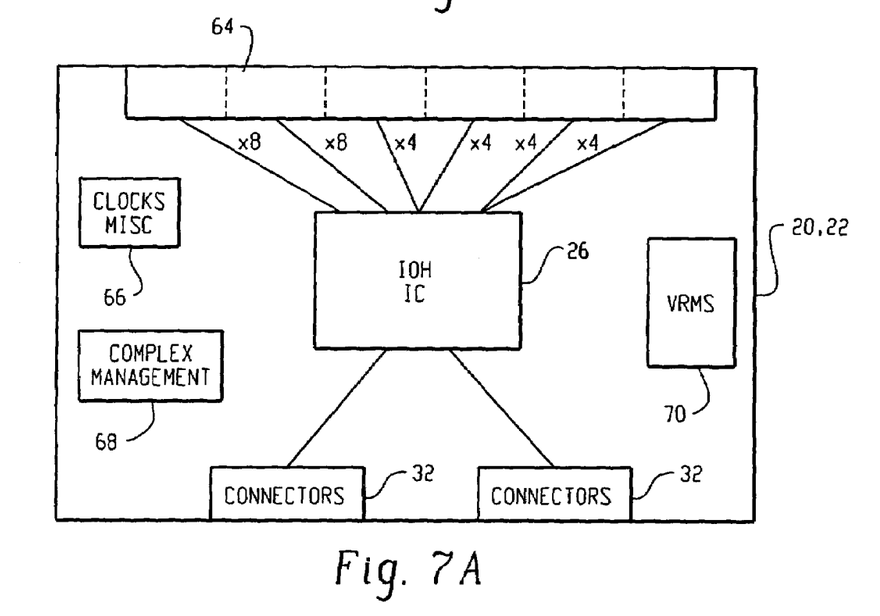
FIGS. 7A-7C are block diagram schematic illustrations of the IO controller module with different IO connectivity configurations for different IO subsystem applications.
Figure 7B:
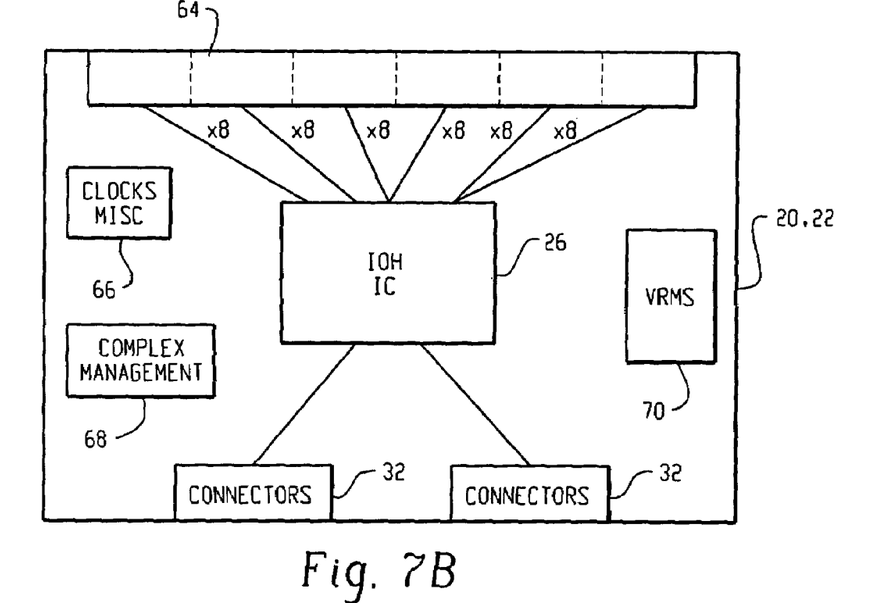
Figure 7C:
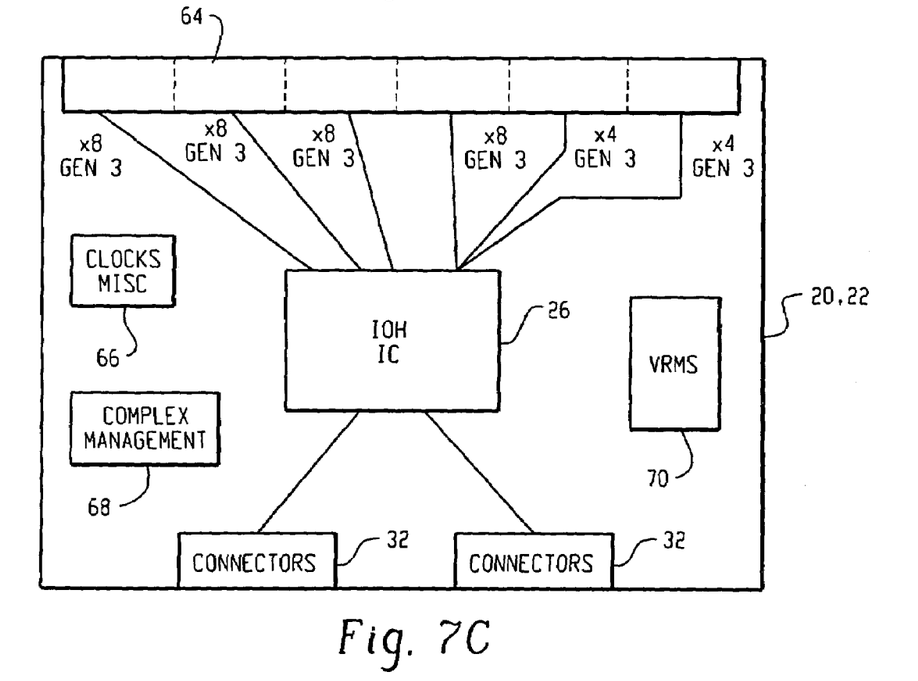

FIGS. 7A, 7B and 7C are block diagram schematic illustrations of IO controller modules 20, 22 with different bandwidth configurations for inserting into the corresponding slot 16, 18 and connecting to the associated connector 104 of enclosure 100 to render enclosure 100 configurable to support various applications. Each IO controller module of FIGS. 7A-7C may be the same or similar to the IO controller module described in connection with the embodiment of FIG. 3. Thus, the same reference numerals as used in FIG. 3 for the module 20, 22 will be used for like circuits of the modules of FIGS. 7A-7C and the description of such circuits will remain the same as described herein above for the IO controller module 20, 22. Any departures from such descriptions will be addressed below.

An exemplary IO controller module configured for a volume server application in the year 2005 is illustrated by the block diagram schematic of FIG. 7A. Referring to FIG. 7A, the IOH 26, which may be an application specific IC, for example, is programmed to provide four of the SIOM slots of enclosure 100 with links of X4 lanes and two of the SIOM slots with links of X8 lanes which may be accomplished with four "bifurcatable" ports, or 32 total lanes. Thus, when this programmed IO controller module is plugged into its corresponding slot of enclosure 100, ports of the IOH 26 are distributed to provide communication links for the six SIOM slots from left to right as X8, X8, X4, X4, X4 and X4, respectively, thus providing the desired mix of bandwidths for the SIOMs of the enclosure 100 for the specific application. In addition, the ports of the IOH connected to the host through connectors 32 may be sized to meet the bandwidth of the IO option modules/slots.

An exemplary IO controller module configured for a high performance, high end server application for the year 2006 is illustrated by the block diagram schematic of FIG. 7B. Referring to FIG. 7B, in this example, the IOH 26 is programmed to provide all six of the SIOM slots of enclosure 100 with links of X8 lanes which may be accomplished with three "bifurcatable" X16 ports, or 48 total lanes. Thus, when this programmed IO controller module is plugged into its corresponding slot of the same enclosure 100, ports of the IOH 26 are distributed to provide communication links for the six SIOM slots from left to right as X8, X8, X8, X8, X8 and X8, respectively, thus providing the desired mix of bandwidths for the SIOMs of the enclosure 100 for the specific application.

An exemplary IO controller module configured for a high performance, high end server application for the year 2010 in which a mix of very high bandwidths and multiple generation signaling is desired is illustrated by the block diagram schematic of FIG. 7C. Referring to FIG. 7C, in this example, the IOH 26 is programmed to provide two "bifurcatable" Gen3 X16 ports, and two additional X4 ports or 40 total lanes. Thus, when this programmed IO controller module is plugged into its corresponding slot of the same enclosure 100, ports of the IOH 26 are distributed to provide Gen 3 communication links for the six SIOM slots from left to right as X8, X8, X8, X8, X4 and X4, respectively, thus providing the desired mix of bandwidths for the SIOMs of the enclosure 100 for the specific application.

Figure 8:
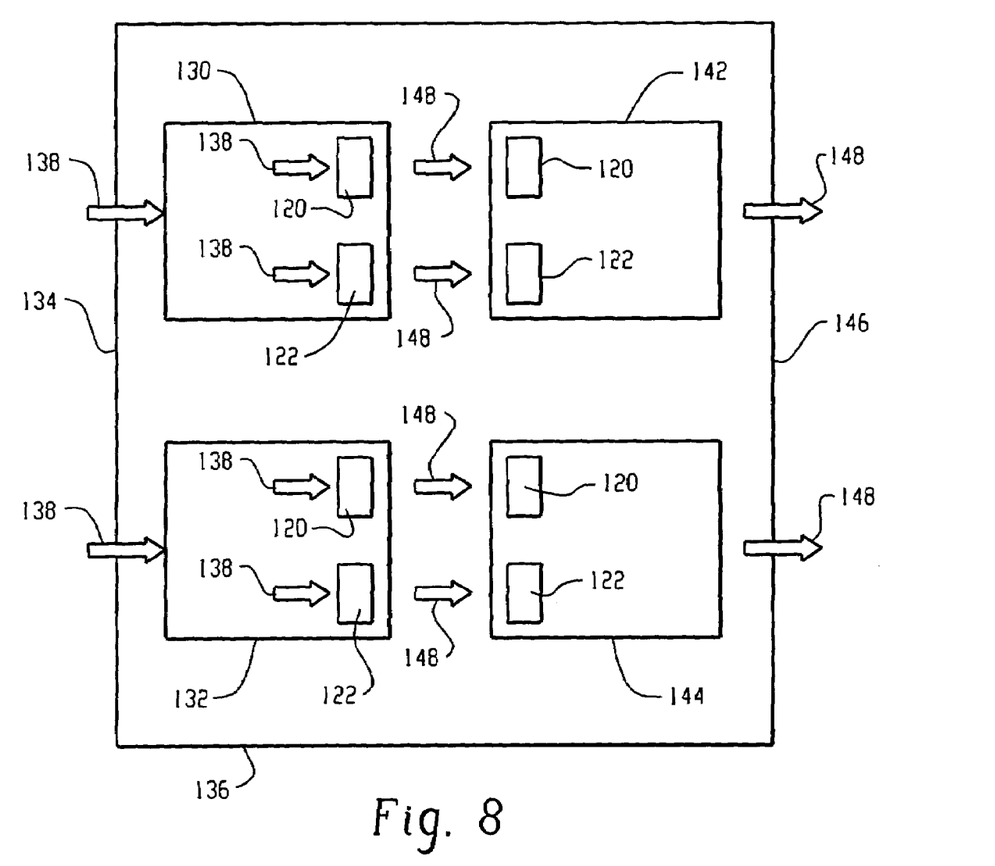
FIG. 8 is a top view illustration of an IO subsystem rack assembly with multiple enclosures.
Figure 9:
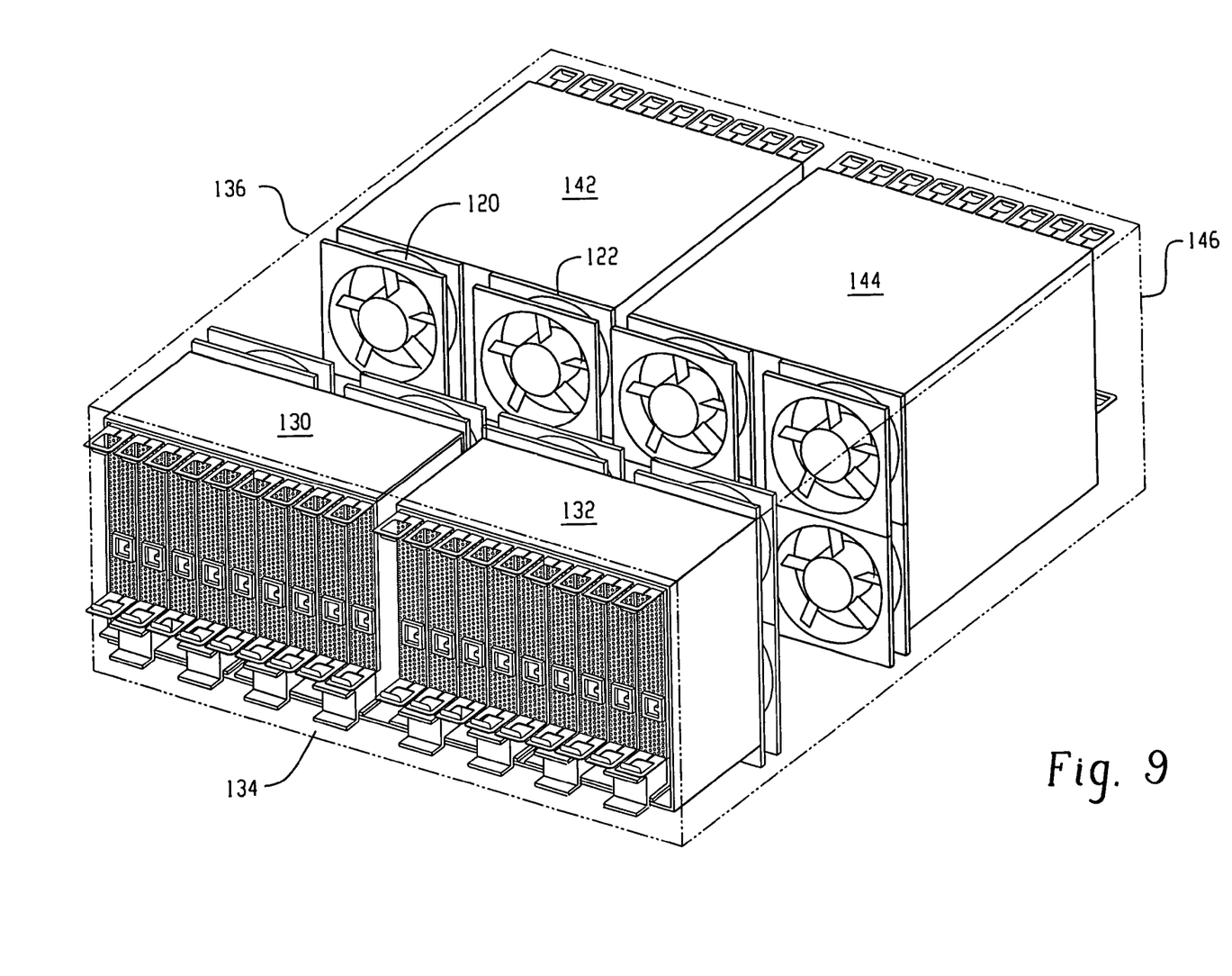
FIG. 9 is an isometric perspective view illustration of the IO subsystem rack assembly with multiple enclosures.

In the present embodiment, the IO subsystem enclosure 10 is sized in length and width to fit two enclosures side-by-side in a 24 inch rack of a conventional cabinet, and sized in depth to permit four enclosures back-to-back in the 24 inch rack as shown in a top view illustration of FIG. 8 and an isometric perspective view of FIG. 9. Referring to FIGS. 8 and 9, two columns 120 and 122 of dual cooling fans are attached to the backplane of each enclosure 10. The cooling fans of the columns 120 and 122 are operative in both the clockwise and counter-clockwise directions so that cooling air may be forced through the enclosures from front to rear and from rear to front depending on the fan control.

For example, the fans of the two side by side enclosures 130 and 132 disposed at the front 134 of the rack 136 may be controlled to force air through the enclosures 130 and 132 from front to rear as depicted by the arrowed directional lines 138. Likewise, the fans of the two side by side enclosures 142 and 144 disposed at the rear 146 of the rack 136 may be controlled to force air through the enclosures 142 and 144 from rear to front as depicted by the arrowed directional lines 146. In this manner, cooling air will be forced through all of the enclosures 130, 132, 142 and 144 in the same direction to maintain the electronic components of the modules of the enclosures at a safe operating temperature.

While the present embodiment uses four fans per enclosure mounted at the backplane thereof, it is understood that this arrangement is depicted merely as an example to illustrate the broader principle of air flow through the enclosures in either direction. It is further understood that this concept may be accomplished by any number of different fan arrangements at the enclosure cabinet. For example, one large fan may be disposed at the rear of the enclosure to accomplish the same result. Also, it is preferred to have the fans integrally mounted to each enclosure in order to have an independently and autonomously operated IO subsystems. But, this inventive aspect is not limited to such an arrangement. Rather, the fans may be mounted at the cabinet just as well to achieve the same or similar result.

Figure 10:
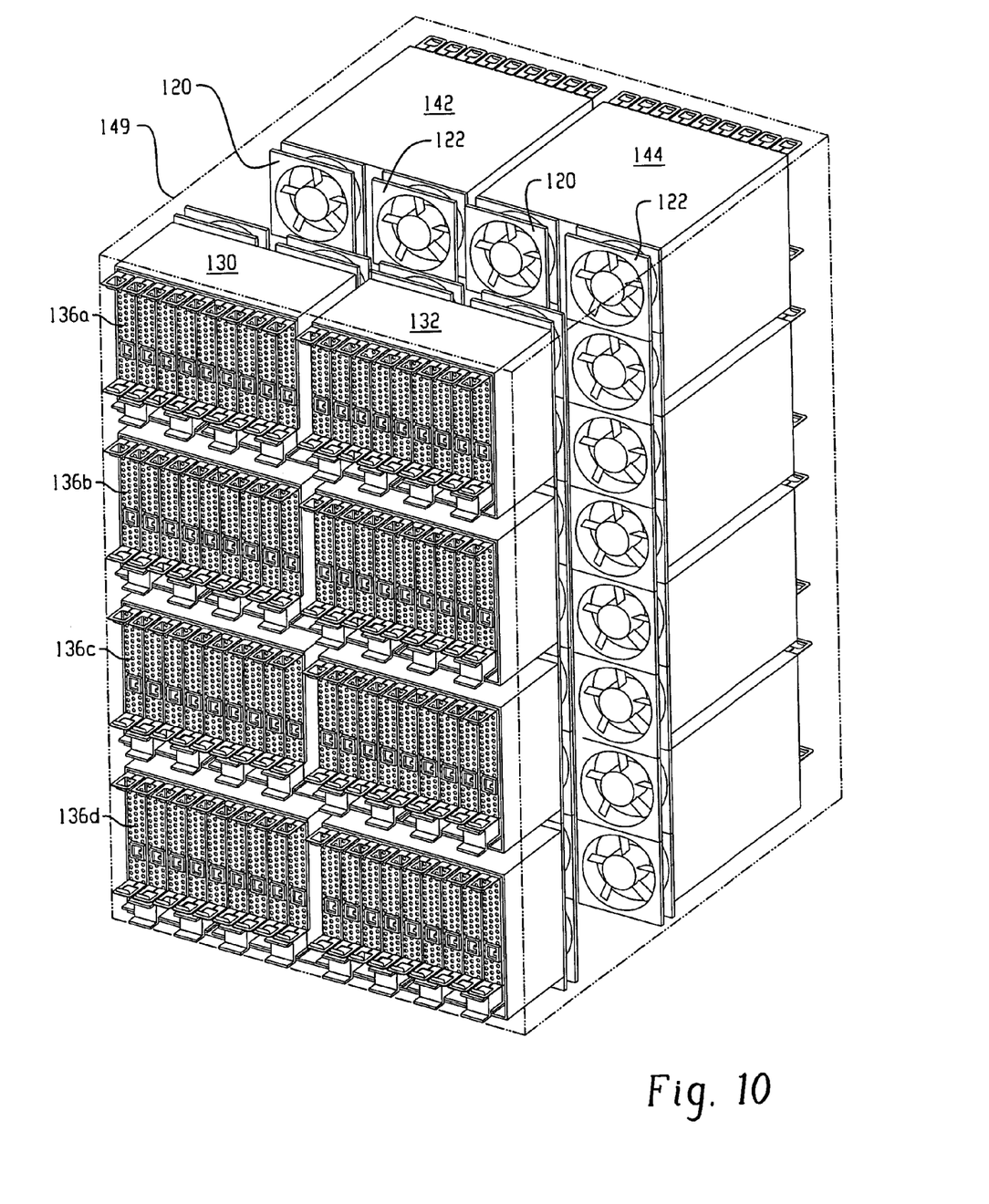
FIG. 10 is an isometric perspective view of multiple racks of IO subsystem enclosures disposed in a cabinet.

FIG. 10 is an isometric perspective view of multiple racks 136a, 136b, 136c and 136d of the IO subsystem enclosures 130, 132, 142 and 144 disposed vertically in a conventional 24 inch rack cabinet 149 for possibly a high end server or Telco application. In this example, the modules of the IO enclosures 130, 132, 142 and 144 are connected to their respective host system and communication and functional units by wire cables through the front connectors thereof. Cooling fans 120, 122 may be attached in the same manner as described in connection with the rack embodiments of FIGS. 8 and 9. The configurable subsystem enclosures of each rack act as modular building blocks of the overall system.

Figure 11:
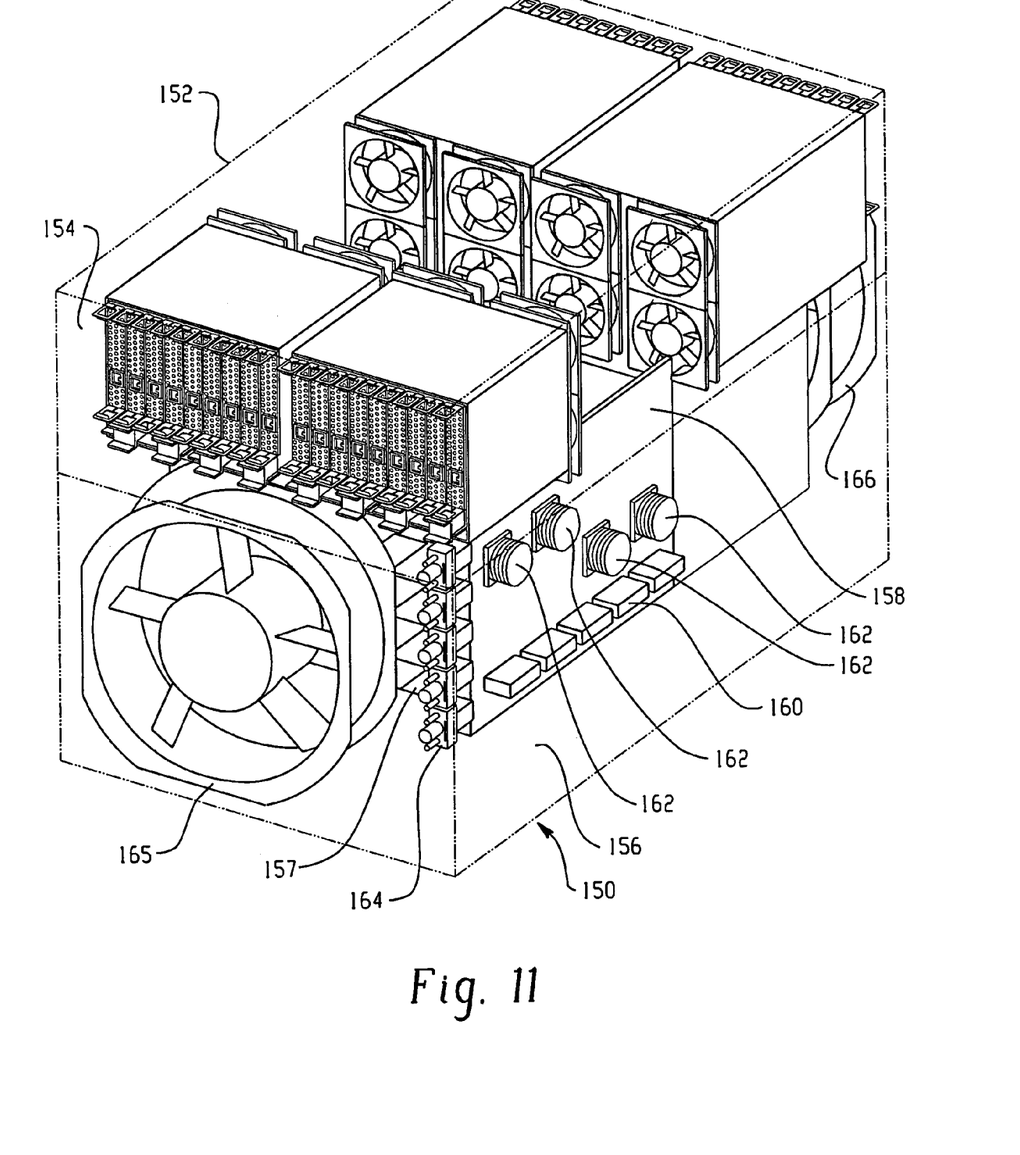
FIG. 11 is a "see through" isometric perspective view of an exemplary mid-range host system in a rack cabinet.

FIG. 11 depicts a "see-through" isometric perspective view of an exemplary mid-range server system disposed in a 24 inch rack cabinet 150. Referring to FIG. 11, a 24 inch rack assembly 152 of four IO subsystem enclosures is disposed in an upper portion 154 of the cabinet 150. The rack assembly 152 may be the same assembly as described herein above in connection with the embodiment of FIGS. 8 and 9, for example. In a lower portion 156 of the cabinet 150 is disposed the multi-processor system and associated IO cabling. A mid-range server may be comprised of approximately eight (8) processors and associated memory and control which may be configured on a plurality of processor PC boards 157, for example.

In the instant server example, the processor PC boards 157 are disposed horizontally in the lower portion 156, preferably from the left of the cabinet 150, and connected to a vertically mounted motherboard 158 at the right of the cabinet. Communication among the processors, memory and IO subsystems may be controlled through a plurality of controller ICs 162 disposed on the motherboard 158. Electrical connections between the motherboard 158 and the IO controller modules of the IO subsystem enclosures of the rack 152 may be made by wire cables from a horizontal row of connectors 160 on the motherboard 158 to the connectors of each of the IO subsystem controller modules. In addition, electrical connections from the motherboard 158 to an IO subsystem external to the cabinet 150 may be made via wire cables from a row of connectors 164 at a vertical edge of the motherboard 158, for example.

The multi-processor section 156 of cabinet 150 may be air cooled by mounting large cooling fans 165 and 166 respectively to the front and rear of the lower portion of the cabinet 150 as illustrated in FIG. 11. The fans 165 and 166 may be controlled to force air through the lower portion 156 in the same flow direction.

Figure 12:
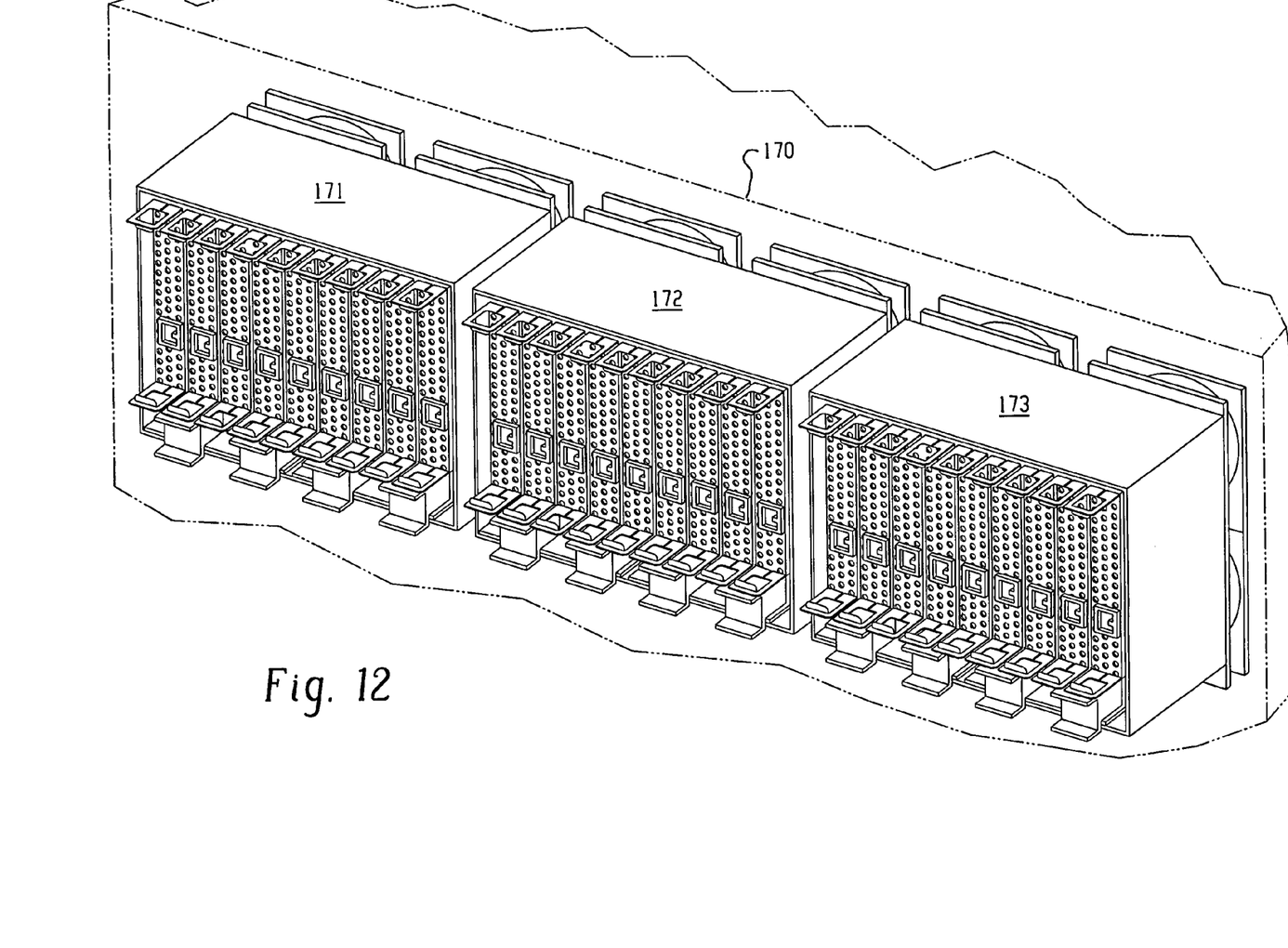
FIG. 12 is an isometric perspective view of a cabinet rack including multiple IO subsystem enclosures.

In a similar manner as the system arrangements described in connection with the embodiments of FIGS. 8, 9, 10 and 11, the IO subsystem enclosures may be configured in a modular building block fashion to form low end and high end server and Telco systems to satisfy a wide variety of applications which may be upgradeable for future system generations. The IO subsystem enclosures of the present embodiment may be also sized such that three enclosures 171, 172, and 173 may be disposed side by side in a 30 inch rack assembly 170 as illustrated in the "see through" isometric view of FIG. 12.

In summary, the IO backplanes of current multi-processor systems are based on industry standard bus interfaces, such as PCI, PCI-X, PCI-E or others. Such backplanes typically require a system motherboard or backplane with a fixed IO host bridge to slot distribution of bandwidth. For PCI standardized systems, this has meant that a change in a pre-designed mix of multi-bit (wide) slots and/or a mix of slot speeds for an application specific IO subsystem required new backplane spins and revisions.

By moving the active logic of the backplane off of the backplane to a centrally disposed IO controller module pluggable into the backplane, and pre-wiring the full bandwidth and sideband complement from each SIOM slot of the IO subsystem enclosure to the IO controller modules via a passive PC board, the following advantages may be realized:

1) all logic failures of the IO subsystem are on field replaceable modules, 2) short etched conductive runs between the IO controller module and slots ensures compatibility with slot speed upgrades for IO subsystem growth, 3) features may be added to the system by upgrading the replaceable IO controller modules, 4) bug fixes are limited to replaceable modules, 5) cost/performance levels may be configured via the IO controller modules and cable capabilities, and 6) a "one IO subsystem fits all" concept is realizable for varying markets.

In addition, including the replaceable power conversion and regulation module in the IO subsystem enclosure addresses at least two aspects of upgradeability:

1) allows varied power supply sources for different markets and price points, e.g. standard single phase 110 VAC, three phase AC, DC (+48V or other), and N+1 or other mechanism for redundancy;

2) provides an ability to change output voltage, current or regulation over time as IO form factor requirements and adapter power requirements evolve; and 3) may be used to provide cost/performance commensurate with adapter types per market segment.

The "one IO subsystem fits all" modular building block aspect provides for reduced manufacturing cost because of volume production, flexible configurations, and common serviceability. This modular building block approach allows configuration of industry standard modules in a form factor that may be utilized in many different system scenarios. As a result of the replaceable IO controller module, the IO subsystem may be configured with faster (X16), slower (X2, X4, X8), or a combination of fast and slow IO links. The IO enclosure design also uniquely permits redundant IO controller module functionality. Also, the totally passive backplane may deliver faster IO functionality at minimum fixed cost that is common across all applications. The configurable IO subsystem satisfies the needs from small volume servers to high-end mainframe class servers.

In addition, the IO subsystem includes power and cooling capabilities integral to the enclosure along with EMI containment. The cooling forced air flow of the enclosure may be controlled between "front-to-rear" and "rear-to-front" so that two enclosures may be mounted back to back within a cabinet rack and be compliant with IEC regulations. Also, this airflow optimization mechanism allows the enclosure to meet thermal requirements, such as Telcordia GR-3028 regulations.

While the present invention has been described herein above in connection with one or more embodiments, it is understood that such embodiments were merely presented by way of example with no intention of limiting the present invention in any way. Accordingly, the present invention should not be limited by the description of the instant specification, but rather construed in breadth and broad scope in accordance with the recitation of the claims appended hereto.

What is claimed is:

1. An enclosure for an input-output (IO) subsystem comprising:
   a backplane;
   a plurality of first slots for accepting corresponding IO option modules;
   a second slot for accepting an IO controller module;
   a plurality of first connectors corresponding to the plurality of first slots for connecting the corresponding IO option modules to the backplane; and
   a second connector corresponding to the second slot for connecting the IO controller module to the backplane;
   wherein the backplane includes communication links for interconnecting the second connector to each of the plurality of first connectors.

2. The enclosure of claim 1 including:
   a third slot for accepting a power supply module; and
   a third connector corresponding to said third slot for connecting the power supply module to the backplane.

3. The enclosure of claim 2 wherein the backplane includes interconnections between the third connector and each of the first and second connectors.

4. The enclosure of claim 2 including:
   a redundant third slot for accepting a redundant power supply module; and
   a redundant third connector corresponding to said redundant third slot for connecting the redundant power supply module to the backplane.

5. The enclosure of claim 1 including:
   a redundant second slot for accepting a redundant IO controller module; and
   a redundant second connector corresponding to said redundant second slot for connecting the redundant IO controller module to said backplane;
   wherein the backplane includes communication links for interconnecting the redundant second connector to each of the plurality of first connectors.

6. The enclosure of claim 1 wherein the second slot is shielded against electro-magnetic interference.

7. The enclosure of claim 1 wherein the first and second connectors are integral to the backplane.

8. The enclosure of claim 1 wherein the plurality of first slots are vertically disposed in the enclosure; and wherein the second slot is horizontally disposed in the enclosure.

9. The enclosure of claim 1 wherein the enclosure is sized to fit two enclosures side-by-side on a single level of a rack assembly.

10. The enclosure of claim 1 wherein the enclosure is sized to fit four enclosures side-by side and back-to-back on a single level of a rack assembly.

11. The enclosure of claim 1 including a fan assembly for forcing cooling air flow through the enclosure.

12. The enclosure of claim 1 wherein the enclosure is sized to fit three enclosures in a rack assembly.

13. A configurable input-output (IO) subsystem for a host system comprising:
   an enclosure including a plurality of slots and a backplane;
   a plurality of IO option modules disposed into a corresponding plurality of slots of said enclosure and connected electrically to said backplane, each IO option module of said plurality being application specific and connectable to a corresponding functional entity for communicating with said host system; and
   a replaceable IO controller module disposed into a corresponding slot of said enclosure and connected electrically to said backplane, said backplane including communication links for interconnecting said IO controller module to each of the plurality of IO option modules, said IO controller module connectable to said host system and operable to configure the communication link between the host system and each of the IO option modules according to the specific applications performed thereby.

14. The IO subsystem of claim 13 including a power supply module disposed into a corresponding slot of the enclosure and connected electrically to the backplane, the backplane including connections for interconnecting said power supply module to each of the plurality of IO option modules and IO controller module.

15. The IO subsystem of claim 14 wherein the power supply module is connectable to different power sources.

16. The IO subsystem of claim 14 including a redundant power supply module disposed into a corresponding slot of the enclosure and connected electrically to the backplane, the backplane including connections for interconnecting said redundant power supply module to each of the plurality of IO option modules and IO controller module.

17. The IO subsystem of claim 13 including a second replaceable IO controller module disposed into a corresponding slot of the enclosure and connected electrically to the backplane, the backplane including communication links for interconnecting said second IO controller module to each of the plurality of IO option modules, said second IO controller module also connectable to the host system and operable to configure the communication link to each of the IO option modules according to the specific applications performed thereby.

18. The IO subsystem of claim 13 wherein each communication link is pre-disposed with multiple lane widths; and wherein the IO controller module is operable to configure the number of lane widths of the communication link for each IO option module of the plurality.

19. The IO subsystem of claim 18 wherein the IO controller module is operable to configure the number of lane widths of the communication link for each IO option module of the plurality based on the application bandwidths thereof.

20. The IO subsystem of claim 18 wherein each communication link is pre-disposed with multiple lane widths to meet a maximum bandwidth capability.

21. The IO subsystem of claim 13 wherein the enclosure includes a fan assembly for forcing cooling air through the enclosure.

22. A host system comprising:
a cabinet including a plurality of rack assemblies;
a plurality of processors and associated memory disposed in a first rack assembly of said cabinet; and
a plurality of input-output (IO) subsystems disposed in a second rack assembly of said cabinet, each IO subsystem comprising:
an enclosure including a plurality of slots and a backplane;
a plurality of IO option modules disposed into a corresponding plurality of slots of said enclosure and connected electrically to said backplane, each IO option module of said plurality being application specific and connectable to a corresponding functional entity for communicating with said host system; and
a replaceable IO controller module disposed into a corresponding slot of said enclosure and connected electrically to said backplane, said backplane including communication links for interconnecting said IO controller module to each of the plurality of IO option modules, said IO controller module connectable to at least one processor of said plurality and operable to configure the communication link to each of the IO option modules according to the specific application performed thereby.

23. The host system of claim 22 wherein the IO subsystem enclosures are sized to fit four enclosures side-by side and back-to-back in the second rack assembly.

24. The host system of claim 23 wherein each IO subsystem enclosure includes a fan assembly operable to force cooling air through the enclosure; and wherein the fan assemblies of the side-by-side IO subsystem enclosures in a front section of the second rack assembly and the fan assemblies of the side-by-side IO subsystem enclosures in a back section of the second rack assembly are all operated to force air through the four enclosures in a single flow direction.

25. The host system of claim 22 including a processor motherboard in the first rack assembly; and wherein the plurality of processors and associated memory are connected to the processor motherboard in the first rack assembly of said cabinet; and wherein the IO controller modules of the IO subsystem enclosures are connectable to the processor motherboard.

* * * * *